J. G. McGUFFEY & R. P. DOWLER.
TROLLEY HEAD AND GUARD.
APPLICATION FILED JAN. 2, 1908.
912,400.
Patented Feb. 16, 1909.
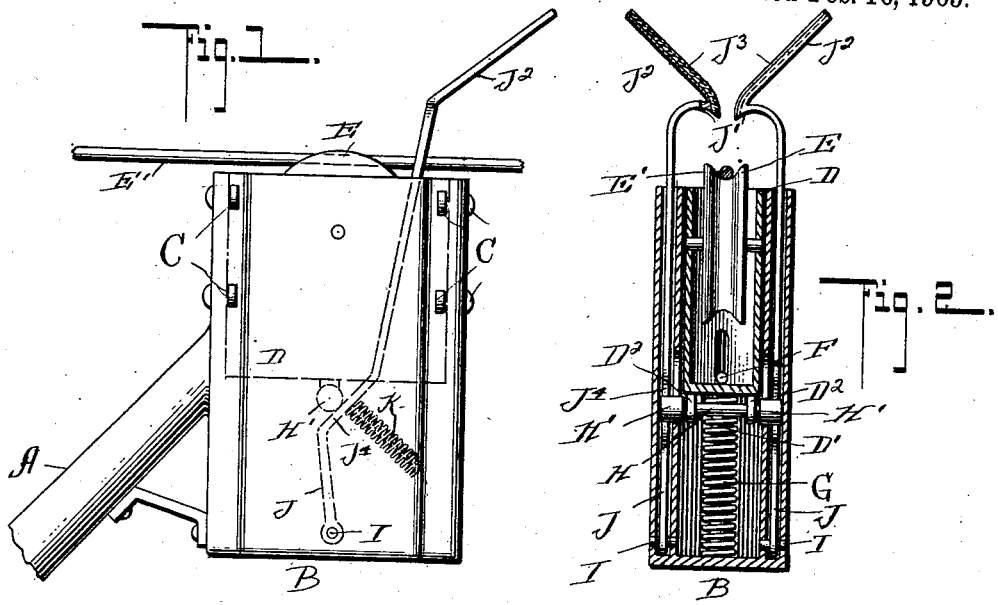
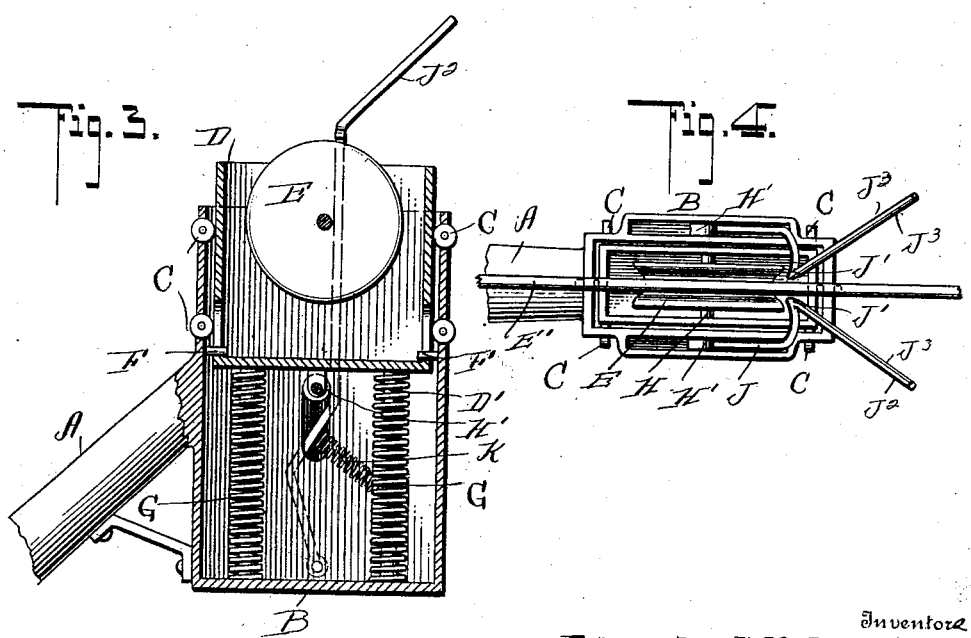
Witnesses
Rea P. bright.
E. B. McBath.
Inventors
John G. McGuffey and
Rae P. Dowler,
By O'Meara & Brock
Attorneys

UNITED STATES PATENT OFFICE.

JOHN G. McGUFFEY AND RAE P. DOWLER, OF GROVEPORT, OHIO.

TROLLEY-HEAD AND GUARD.

No. 912,400.      Specification of Letters Patent.      Patented Feb. 16, 1909.

Application filed January 2, 1908. Serial No. 408,891.

*To all whom it may concern:*

Be it known that we, JOHN G. McGUFFEY and RAE P. DOWLER, citizens of the United States, residing at Groveport, in the county of Franklin and State of Ohio, have invented a new and useful Improvement in Trolley-Heads and Guards, of which the following is a specification.

Our invention relates to trolley heads and guards, the object being to provide the head with a pair of guard-arms which also form finders so as to enable the conductor to place the head on the trolley-wire, thereby overcoming the difficulties now existing with heads now in use of placing the same on the wire.

A further object of our invention is to provide a trolley head which is exceedingly cheap and simple in construction, and one which is very strong and durable the parts being so arranged that they are not liable to get out of order.

A still further object is to provide the casing of the trolley-head with springs on which is mounted a casing carrying the trolley wheel so that when the wheel engages the trolley-wire the casing will be forced downwardly, so as to operate the guard arms.

With these various objects in view, the invention consists in the novel features of construction, combination and arrangement of parts hereinafter fully described and pointed out in the claims.

In the drawing forming a part of this specification:—Figure 1 is a side view of our improved trolley head and guard showing the trolley-wheel in engagement with the trolley wire. Fig. 2 is a transverse section of Fig. 1. Fig. 3 is a longitudinal sectional view, and Fig. 4 is a top plan view of the same.

In the drawing A indicates a trolley-pole on the end of which is secured a casing B which is provided with anti-frictional rollers C arranged in slots formed in its sides adjacent its upper end which bear against the casing D arranged in the casing B, the casing D being provided with an ordinary trolley-wheel E adapted to engage the trolley-wire E' as will be hereinafter fully described. The casing D is provided with vertical slots in which project stop-pins F extending inwardly from the casing B and the casing is provided with downwardly projecting pins D' on its bottom, on which are arranged the upper ends of coiled-springs G mounted on stud-pins secured on the bottom of the casing B, these springs normally holding the casing D upwardly as shown in Fig. 3. Apertured lugs $D^2$ are formed on the bottom of the casing D in which is secured a shaft H, on the ends of which are mounted rollers H' which work in vertical slots formed in the sides of the casing B and the casing is provided with offset portions on its sides forming double walls, the outside wall inclosing the rollers and slots, so as to prevent rain or snow from getting within the casing.

The double walls of the casing are connected together adjacent their lower ends by pins I on which are mounted the lower ends of guard-arms J which extend upwardly between the walls, and are provided with inwardly projecting portions J' forming guards and diverging ends $J^2$ forming finders which are insulated by inserting glass bricks $J^3$ on their faces and it will be seen that the trolley will be carried by the same onto the trolley-wheel. The arms are provided with oblique portions $J^4$ which are normally held across the slot formed in the inner walls of the casing, in which the rollers work, so that when the wheel engages the trolley wire and the casing is forced downwardly the wheels will engage the arms and force the same backward.

It will be seen that when the trolley-wheel engages the trolley-wire the spring of the trolley-pole, (not shown) being greater than the springs which support the casing carrying the trolley-wheel, the wheel will be forced downwardly so as to throw the rollers into engagement with the guard-arms.

The guard-arms are normally held in a vertical position by coiled springs K so that as soon as the head is removed from the trolley wire the arms will spring upwardly in a vertical position, so that the head can be readily placed on the wire.

Having thus fully described our invention, what we claim as new and desire to secure by Letters Patent is:—

1. In a device of the kind described, the combination with a trolley-pole carrying a casing, of a trolley-wheel slidably mounted in said casing, guard-arms pivotally mounted in said casing, and means carried by said trolley-wheel for operating said arms, for the purpose described.

2. In a device of the kind described, the combination with a trolley-pole carrying a casing, arms pivotally mounted in said casing, a second casing carrying a trolley-wheel slidably mounted in the first mentioned casing and provided with means for operating said arms, when said wheel engages the trolley-wire, for the purpose described.

3. The combination with a trolley pole carrying a casing, of a casing slidably mounted in said casing carrying a wheel, guard-arms pivotally mounted in said first mentioned casing, and rollers carried by said wheel for throwing said guard-arms rearwardly when said wheel engages the trolley-wire, for the purpose described.

4. The combination with a trolley-pole carrying a casing, of a spring actuated casing mounted in said casing carrying a trolley-wheel, guard-arms pivotally mounted in the casing carried by the pole provided with oblique portions, and diverging ends forming a finder, and rollers carried by the casing carrying the wheel adapted to engage the oblique portions of said arms, for the purpose described.

5. The combination with a trolley pole provided with a casing, of a spring actuated casing mounted within the first mentioned casing, a trolley wheel carried by the last mentioned casing and guard arms pivotally mounted in the casing carried by the pole adapted to be operated by the casing carrying the trolley wheel.

6. The combination with a trolley pole carrying a casing, of a casing slidably mounted within said casing carrying a trolley wheel, rollers carried by the last mentioned casing, guard arms pivotally mounted in the casing carried by the trolley pole provided with oblique portions adapted to be engaged by the rollers carried by the inner casing and springs mounted in the casing carried by the trolley pole for normally holding the rollers of the inner casing out of engagement with the oblique portions of the guard arms.

JOHN G. McGUFFEY.
RAE P. DOWLER.

Witnesses:
J. FRED PAXTON,
M. C. WARREN.